United States Patent

[11] 3,570,748

[72] Inventors James Warren Coyle
Montville, N.J.;
Louis John Marsella, Leominster, Mass.
[21] Appl. No. 565,667
[22] Filed June 29, 1966
[45] Patented Mar. 16, 1971
[73] Assignee Standard Packaging Corporation
New York, N.Y.
Continuation-in-part of application Ser. No. 298,278, July 29, 1963, now abandoned.

[54] COMPOSITE FILM AND METHOD
42 Claims, 5 Drawing Figs.
[52] U.S. Cl. .................................................. 229/53,
156/244, 156/272, 156/331, 161/247, 161/253,
161/402, 161/227, 229/3.5, 264/346
[51] Int. Cl. ............................................... B29d f/24,
B32b 27/08, B32b 31/12
[50] Field of Search ........................................ 156/331,
244, 272; 161/253, 255, 252, 24 (F), 402;
204/168; 264/1, 436; 229/53; 117/47, 93.1

[56] References Cited
UNITED STATES PATENTS

| | | | |
|---|---|---|---|
| 2,956,723 | 10/1960 | Tritsch ......................... | 156/244 |
| 2,828,237 | 3/1958 | Rosser ......................... | 156/331 |
| 3,297,518 | 1/1967 | Maschner et al. ............ | 161/184 |
| 3,222,440 | 12/1965 | Murphy ........................ | 264/346X |
| 3,371,002 | 2/1968 | Reddeman .................. | 156/244 |
| 3,033,707 | 5/1962 | Lacy et al. ................... | 161/P.E. |
| 2,876,358 | 3/1959 | Root ............................. | 250/49.5 |

OTHER REFERENCES
Polyamide Resins, Floyd, 1958, pp. 14—15.

Primary Examiner—Robert F. Burnett
Assistant Examiner—Mark A. Litman
Attorney—Amster & Rothstein ABSTRACT: A laminated film is formed by extrusion coating a film-forming synthetic linear polyamide in a thin film onto a polyolefin film. The polyolefin surface is subjected to oxidative influence prior to coating, and adhesive primers may be used. One embodiment of the film includes a saran layer, preferably intermediate the synthetic linear polyamide and polyolefin.

INVENTORS.
JAMES W. COYLE &
LOUIS JOHN MARSELLA
BY their ATTORNEYS.

INVENTORS.
JAMES W. COYLE &
LOUIS JOHN MARSELLA
BY
their ATTORNEYS.

COMPOSITE FILM AND METHOD

This application is a continuation-in-part of our copending application, Ser. No. 298,278, filed Jul. 29, 1963, now abandoned.

This invention relates to laminated films comprising polyalkylene and a nylon. In a preferred embodiment, a coating of a saran is applied to the polyalkylenenylon laminate. The invention also relates to an improved method for obtaining the novel laminated films described above.

Films and other articles of polyethylene and similar nonaromatic hydrocarbon olefin polymers have many advantageous characteristics including chemical inertness, good physical properties including a low moisture vapor transmission rate, toughness and resistance to tearing, excellent flexibility at low temperatures and good heat sealing characteristics.

Synthetic linear polyamides, hereinafter referred to as nylon, have a number of complementary characteristics making their use advantageous as packaging films under certain circumstances. Nylon generally has a lower oxygen transmission rate than polyethylene and has greater physical strength. It is therefore desirable to provide composite films of polyolefin and nylon.

In one typical prior art process of forming nylon and polyethylene composite films, preformed webs of each polymer are employed and the bonding is effected by the application of an adhesive. This process is performed in an operation separate from the film-forming operations on expensive and complex laminating machinery. In an alternative prior art process, polyethylene has been extruded on to a nylon substrate by the usual melt extrusion process. The films obtained by either of the prior art processes have been expensive.

Part of the reason for the expense of the prior art extrusion coated nylon-polyethylene composite films is the relatively heavy nylon substrate required to present a self-supporting film. Nylon is by far the most expensive of the two materials. Also, in extrusion processes, the thermoplastic polymer of lower melting point than the base substrate, i.e., the one having a lower extrusion temperature than the melting point of the base, is normally employed as the substrate so that the molten product does not adversely affect the substrate when it impinges upon it. In common practice, therefore, lower melting point materials, such as polyethylene, are extruded upon the surface of polystyrene, nylon and other materials of higher softening point.

Nylon polymers characteristically have a melting point in the approximate range 400° F. to 550° F. Polyalkylenes, such as polyethylene, characteristically have a melting point or distortion point ranging from 200° F. to 260° F., and polypropylene has a melting point of about 340° F.

Unexpectedly it has been found that packaging films having the outstanding combined characteristics of a polyolefin and a nylon can be provided in an economical manner by extrusion coating a film-forming nylon in a thin film onto a supporting substrate of polyolefin film. The two composite films are joined through a thin layer of an intermediate adhesion-promoting primer. The resulting low cost film has high impact fatigue characteristics, is more durable than comparable films prepared from other resins, and, when humidified according to one feature of this invention, will postshrink around packaging products, eliminating the appearance of excessive material. In addition, the films have the combined advantageous properties of each of its component parts.

In accordance with one preferred embodiment of this invention, a saran coating is applied to the composite film on the nylon surface. Alternatively, the saran may be applied on the primer layer of the polyolefin substrate surface prior to application of the nylon to the composite. In either case, the still further advantage of providing a barrier against the transmission or permeation of gases and vapors in addition to water vapor is provided.

In accordance with the process of this invention a polyolefin, such as polyethylene which may have been previously treated on one surface with electrostatic discharge is first given a supplementary electrostatic discharge treatment sufficient to insure uniform surface activity. The surface is then coated with an adhesion-promoting primer layer, preferably by use of a conventional gravure coating roll. The primer is applied to the electrostatic discharge treated surface and may be applied as an organic solvent solution or as an aqueous solution.

After application of the primer, the substrate is passed through an oven to facilitate removal of the solvent from the primer layer. The film leaving the oven is preferably again subjected to electrostatic discharge treatment on the exposed primer surface, to insure a consistent, uniform bond. The substrate is now ready for the melt extrusion coating operation.

Nylon containing no more than about 0.1 percent, preferably 0.05 percent moisture is then melt extruded onto the substrate, meeting the substrate at the nip of a conventional extrusion coater. After leaving the nip, the composite film passes around a cooling drum and upon leaving the drum is in the form of an integral composite film. In accordance with a preferred embodiment of the process of this invention, the composite film is then passed through a steam chamber to increase the moisture content of the nylon portion of the composite so that it contains from 1.5 percent to 4 percent and preferably 2.5 percent moisture. Adjustment of the moisture content to this range provides a composite film having exceptional plastic recovery properties. The film is then wound on a storage roll.

As an optional feature, the composite film after leaving the extrusion coating apparatus, may be passed under a bank of infrared heaters or other suitable radiant heaters adjacent the nylon surface to catalyze the growth of crystals in the nylon portion of the composite. This optional step adds stiffness to the film and provides improved machining characteristics where stiffness is desired.

Where the composite is to receive a saran coating, the nylon surface is first treated with an electrostatic discharge and an adhesion-promoting primer layer is then applied from a solvent or water solution as in the first primer application step. After removal of the solvent from the adhesion-promoting primer by drying in an oven, the film is given a coating of saran, again preferably from a solvent solution. The saran coating is dried, and the composite film wound on a storage roll.

The polyolefin substrate used according to this invention may be any of the well-known nonaromatic hydrocarbon olefin polymers including polypropylene, polyethylene and copolymers of ethylene and propylene and the like. The preferred substrate material is polyethylene and may be the so-called "low density" polyethylene having an approximate specific gravity of 0.92 gram per cubic centimeter and a melting point of about 200° F., a so-called "medium density" polyethylene having a specific gravity of about 0.93 gram per cubic centimeter and a melting point of about 230° F., or a so-called "high density" polyethylene having a specific gravity in the approximate range of 0.95 to 0.96 gram per cubic centimeter and a melting point of about 260° F. Polypropylene which has an approximate melting point of 340° F. is also suitable as a substrate in accordance with the present invention.

The polyolefin substrate film may have a thickness of between about 0.8 and about 3 mils. The preferred thickness for use in preparing laminates suitable for packaging films is in the range of 1.5 to 2 mils.

The adhesion-promoting primers used according to this invention include the polyalkylene imines, such as those disclosed, for example, in Rosser U.S. Pat. No. 2,828,237, and Lacey et al., U.S. Pat. No. 3,033,707. Of the polyalkylene imines, it has been found that the polyethylene imine provides improved results. However, other polyalkylene imines equivalent to the polyethylene imines may be utilized. The most useful of these, from a practical standpoint, are those comprised of alkylene units having from 2 to about 4 carbon atoms.

The preferred adhesion-promoting primers are urethane-based materials such as urethane prepolymers catalyzed by dibutyl tin dilaurate. Two primers of this class which have been found to provide excellent results are sold under the trade name Cemen-TAC NA141K and Cemen-TAC NA141N. Cemen-TAC NA141K is a hexane-dispersed, dibutyl tin dilaurate catalyzed, urethane prepolymer derived from a ricinoleate base and toluene diisocyanate. The specific gravity is 0.960. The volatile content, hexane, is 20 percent by weight. The free NCO and free toluene diisocyanate contents are 6.75 percent and 3.0 respectively.

Cemen-TAC NA141N is a hexane-dissolved, dibutyl tin dilaurate catalyzed polyurethane prepolymer. The prepoly mer is the reaction product of toluene diisocyanate with polyhydroxy components which are essentially saturated and contain internal aliphatic groupings. The volatile content, hexane, is 20 percent by weight. The specific gravity is 0.960. The free NCO and free toluene diisocyanate contents are 3.9 percent and less than 0.5 percent respectively.

Another urethane-based composition that has been found to be useful is one sold by the Union Paste Company, the system comprising a primer with the code name L-642 and a catalyst having the code name L-837.

Other adhesion-promoting primers which may be used in accordance with this invention include aqueous solutions of modified casein, such as those sold by the Borden Company under the designation Borden 571-127B-LB.

The adhesion-promoting primers need be used in only very small quantities to provide the desired result according to this invention. In the case of polyethylene imine, amounts ranging from about 2 to about 30 grams per thousand square feet of olefin substrate surface, where the substrate surface is pretreated wit electrostatic discharge, have been found to be satisfactory. Amounts less than about 2 grams per thousand square feet of substrate surface generally do not provide satisfactory adhesion characteristics. On the other hand, amounts in excess of 30 grams on the same basis may provide discoloration problems in the composite film, and when amounts greatly in excess of 30 grams are used, the result is generally an undesirable weak laminate. The preferred level of the polyethylene imine is 10 grams per thousand square feet of olefin substrate surface.

The urethane-based primers described above are also used in very small quantities. The primers are preferably applied to the substrate surface as a solution or suspension in methyl ethyl ketone, the solution or slurry containing about 10 percent solids. The primer may be applied from coating rollers, one suitable system being a four roll Annilox system. One suitable level at which the urethane compositions may be applied is about 15 grams per 1,000 square feet of substrate surface, with an approximate range of 10 to 30 grams per 1,000 square feet.

The term "nylon" as employed herein and in the appended claims is used to describe synthetic linear polyamide resin. Very satisfactory laminated structures have been prepared according to this invention using the following types of film-forming nylons:

a. Nylon 6/6 types, having an approximate melting point of 515° F., represented by the commercial products sold by E.I. duPont de Nemours & Co., Inc. under the trade designations Zytel 108, 42, and 41X;
b. Nylon 6 types, sold by the Spencer Chemical Company under the trade designations Spencer 600, 606, and NX142 and having a melting point of 430° F.;
c. A copolymer of equal parts of Nylon 6/10 and Nylon 6/6, sold by E.I. duPont de Nemours & Co., Inc. under the trade designation FE2345 and having a melting point of 405—412°F.;
d. Copolymers comprising 90 percent of Nylon 6/6 and 10 percent of Nylon 6, sold by E. I. duPont de Nemours & Co., Inc. under the trade designation FE2380 and having a melting point of 460° F.; and
e. A terpolymer comprising 80 percent of Nylon 6/6, 10 percent of Nylon 6 and 10 percent of Nylon 6/10 sold by E. I. duPont de Nemours & Co., Inc. under the trade designation FE2353 and having a melting point of about 440° F.

The film-forming nylon is applied to the polyolefin substrate from a melt extrusion device to provide a nylon film on the final composite film ranging in thickness from 0.1 mil to 1.5 mils. The preferred thickness of the nylon film is 0.5 to 1.0 mil. A nylon film thickness in excess of 1.5 mils is expensive and provides little additional improvement in the composite. A film thickness of less than about 0.1 mil is insufficient to provide the desired benefits of the nylon.

The saran coating applied to the surface of the composite film structure of this invention is preferably a copolymer of vinylidene chloride and acrylonitrile and is applied from a solution of the saran in an organic solvent. Examples of suitable solvents are acetone, tetrahydrafuran, methyl ethyl ketone and mixtures of ketones. Suitable sarans contain at least about 60 and preferably from 85 to 95 wt. percent of vinylidene chloride in the copolymer molecule.

Other saran copolymers of vinylidene chloride, such as a copolymer of vinylidene chloride and vinyl chloride may be used. For example, Daran 210, supplied by Dewey & Almy Division of W. R. Grace Corp. may be used. In this case, however, the copolymers are applied as aqueous emulsions and it is necessary that curing types of primers be used. One suitable primer is a modified polyester based on melamine with an amine aldehyde as a crosslinking agent. These materials are known as alkyd resins. Polyalkylene imines are not good primers for sarans which are applied as coatings from aqueous emulsions.

Preferred coatings of saran range from 1/3 to 1 pound per thousand square feet of substrate surface.

Referring to the process of this invention, recourse is had to the several points therein where a polymer surface is subjected to oxidative influences. This is preferably accomplished by an electrostatic discharge treatment. This treatment is well known in the art and is described, for example, together with a suitable apparatus for conducting this treatment, in Kritchevar, U.S. Pat., No. 2,916,620. The extent of the treatment may vary in accordance with well-known considerations to provide a surface which is receptive to a subsequently applied coating. From 1200 to 1800 watts have been used with satisfactory results at web speeds of 150 to 250 feet per minute where the electrode was positioned one-sixteenth of an inch from the substrate surface. Substrate widths up to 42 inches were used.

The preferred oxidative influence applied to the substrate surface is an electrostatic discharge as mentioned above. The electrostatic discharge treatment increases the energy of the surface as measured by an increased wettability of the surface to water. While electrostatic discharge treatment is preferred, other equivalent treatments, such as flame treatment, the use of strong oxidizing agents, nitrous oxide, ozone, ultraviolet radiation, and the like may be employed as desired.

Referring now to the drawings.

Figure 1:
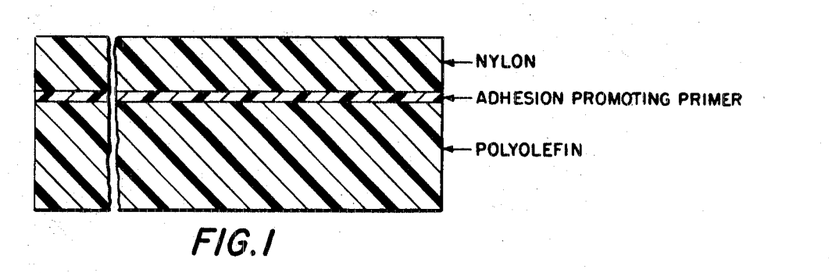
FIG. 1 illustrates in fragmentary cross section a composite film structure prepared in accordance with the invention.

Referring to FIG. 1, the polyolefin represents the substrate of the composite film prepared according to this invention. Illustrated above the polyolefin substrate is a thin adhesion-promoting primer layer, the dimensions of which are somewhat exaggerated in the FIG. for the purpose of illustration. As described above, the surface of the polyolefin film immediately adjacent to the primer layer is treated with electrostatic discharge prior to the application of the primer layer. A similar treatment is preferably applied to the surface of the primer layer before application of the nylon by melt extrusion techniques. The resulting product is an excellent composite film, which has particular usefulness in vacuum formed packages.

Figure 2:
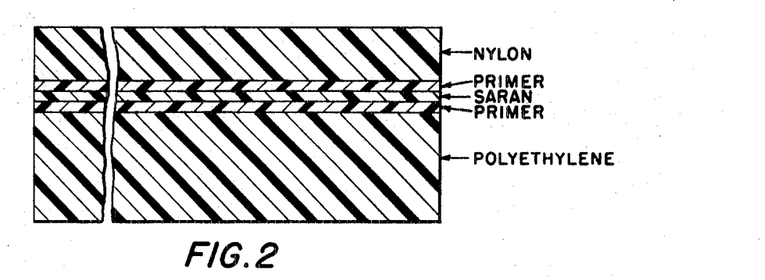
FIG. 2 illustrates in cross section an embodiment of the composite film structure of this invention showing a saran coating applied intermediate the polyolefin and the nylon layers.

FIG. 2 illustrates a preferred embodiment of this invention. The composite illustrated comprises a polyethylene substrate, the upper surface of which, as illustrated in the FIG., is treated with electrostatic discharge prior to the application of the primer layer illustrated immediately above it. The primer layer is polyethylene imine.

The next layer is a layer of saran, following which a second layer of primer preferably polyethylene imine is applied. The saran in this instance is preferably a copolymer of vinylidene chloride and acrylonitrile. The exposed surface of the second primer layer is treated with electrostatic discharge prior to application of the nylon layer by melt extrusion techniques in accordance with this invention.

In the composite structure of FIG. 2, the saran coating is protected on one side by the polyethylene and on the other by the nylon. This arrangement is advantageous, in that localized disruption of the saran coating during use, with consequent loss of the desirable barrier characteristics provided by the saran, is minimized.

Figure 3:
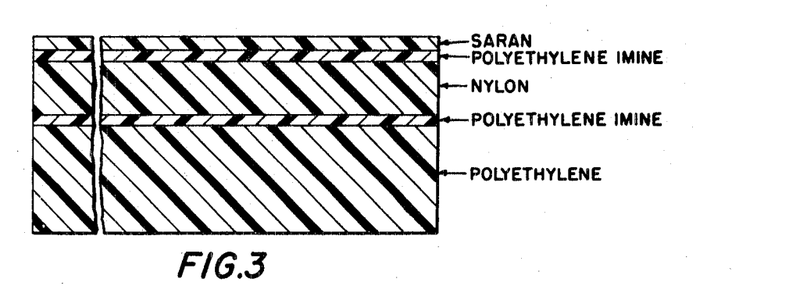
FIG. 3 illustrates in cross section a preferred embodiment of the composite film structure of this invention showing a saran coating over the nylon layer.

FIG. 3 illustrates an embodiment of this invention wherein a second adhesion-promoting primer layer, in this case polyethylene imine, is applied to the exposed nylon surface of the composite of FIG. 1. Prior to the application of the second primer layer, the exposed nylon surface is subjected to an electrostatic discharge treatment. Following the application of the second primer layer, a coating of saran, preferably a copolymer of vinylidene chloride and acrylonitrile, is applied. An advantage of the structure of FIG. 3 is that the polyethylene substrate and the outer saran coating serve to retain the desired moisture content in the nylon layer, and is of particular usefulness where the moisture content of the nylon has been increased to a level of about 1.5 to 4 percent, in accordance with a preferred embodiment of this invention.

Figure 4:
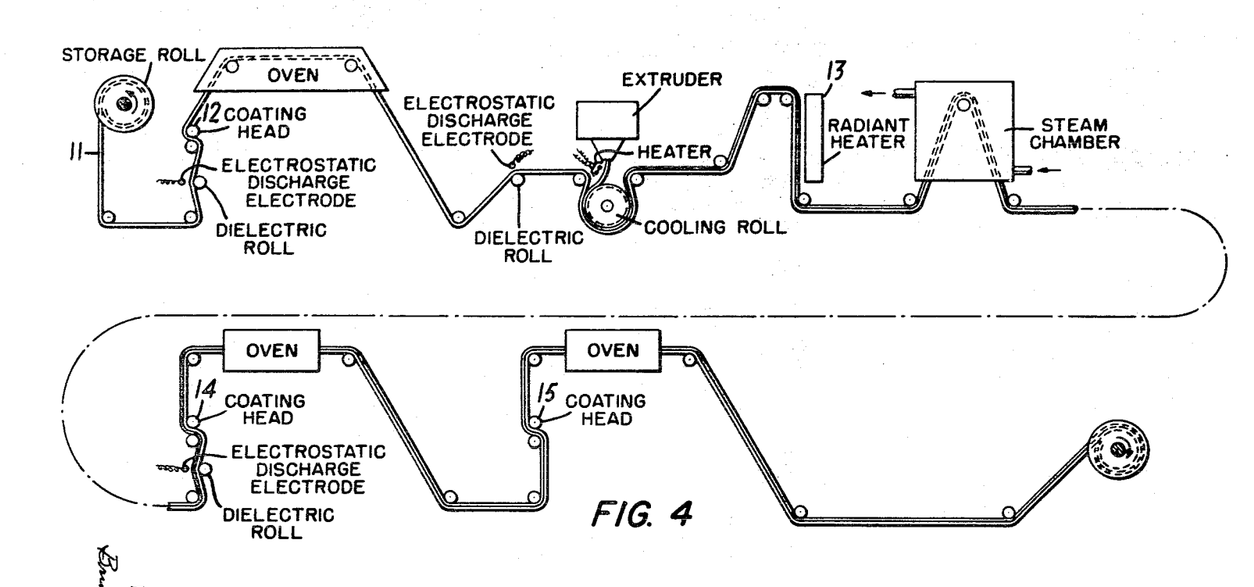
FIG. 4 is a schematic flow diagram illustrating a preferred embodiment of the process of this invention.
Figure 5:
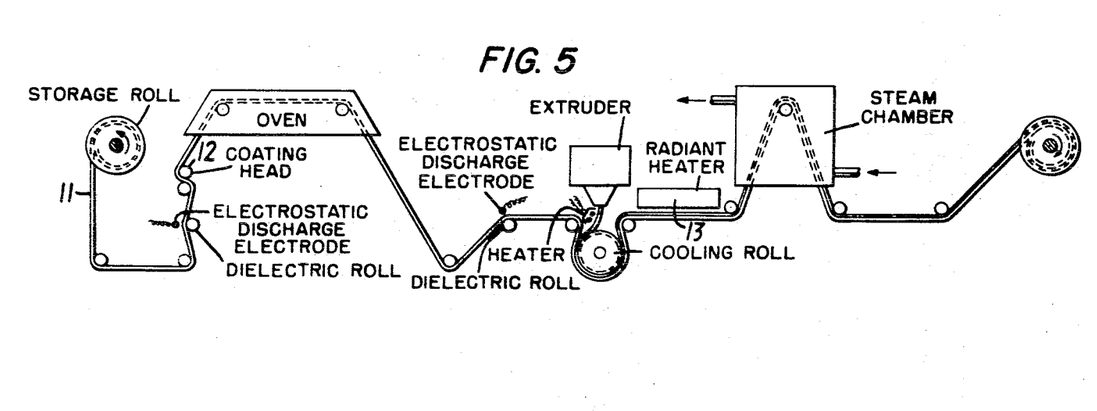
FIG. 5 illustrates by schematic flow diagram the various steps in the process of this invention.

The practice of the process of this invention will be further described with reference to FIGS. 4 and 5 of the drawings. In FIGS. 4 and 5, the polyethylene substrate film 11' is drawn from a storage roll and passed over suitable rollers past suitable electrostatic discharge electrodes to a coating head 12.

At this point, a first coating of a suitable adhesion-promoting primer, such as polyethylene imine, is applied to the treated substrate surface from a solvent or water solution. The coated substrate then passes through a drying oven and thereafter passes a second electrostatic discharge electrode for an optional but preferred treatment of the primer surface. The substrate then moves to the melt extruder. The film of nylon is applied to the treated substrate surface at the nip of the extruder and the cooling roll, at which point a bond is formed between the nylon film and the treated surface of the substrate. The composite film is cooled by its passage around the cooling roll.

FIGS. 4 and 5 show the use of a radiant heater 13 positioned adjacent to the nylon coated surface to catalyze crystallization of the nylon in that portion of the composite. As discussed above, this feature is optional and is used only where it is desired to impart stiffness to the film.

Referring to FIGS. 4 and 5, the composite film leaving the cooling roll is passed through a steam chamber, as indicated, to increase the moisture content of the nylon portion of the composite to a level within the approximate range of 1.5 percent to 4 percent. In the embodiment shown in FIG. 5, the moisturized film is wound on a storage roll to complete the process.

Following the steam chamber in FIG. 4, the balance of the FIG. illustrates the additional processing steps employed in providing a saran coating on the nylon surface of the composite film. After treatment of the nylon surface by passing it past the electrostatic discharge electrode, the composite film is passed to a second coating head 14 which applies a second primer coating of polyethylene imine from a solvent or water solution. After passing through a line drying over, the composite is passed through another coating head 15, where a saran lacquer coating is applied. After passage through a drying oven to dry the saran coating, the film is wound on the storage roll to complete the process.

One of the important advantages of the present invention is the realization of a composite film of polyolefin and nylon wherein the nylon has a thickness between 0.1 and 0.5 mil. The composite is particularly useful in constructing flexible, transparent packages by vacuum forming procedures. Other well-known package procedures may also be used, however. For most purposes, these packages perform as well as packages prepared from similar composite films having a greater thickness of nylon in the composite. In addition, these packages are considerably less expensive because of the minimum amount of nylon required.

Thus the present invention provides a means for preparing a composite film of nylon and polyolefin by economical procedures to provide a packaging film of lower cost than present day composites of polyethylene terphthalate and nylon. The embodiment wherein the additional moisture is imparted to the nylon layer provides a film which is six times as durable as polyethylene terphthalate and twice as durable as present day nylon film composites. The film can be used to prepare a boilable bag or pouch, as well as packages of other conventional shapes and styles.

The following examples further illustrate the process and composite film structures of this invention.

EXAMPLE I

An electrostatic discharge treated film of polyethylene having a thickness of 2.0 mils, and a width of 42 inches, Visking ClQ, sold by the Visking Corporation, was fed from a roll at a rate of 200 feet per minute. The electrostatically treated surface of the substrate was passed adjacent to an electrostatic discharge electrode positioned 1/16 inch from the substrate surface supplied with 1800 watts to insure a sufficiently and uniformly active surface. The substrate material was then advanced through a gravure coating head, where a 1 percent aqueous solution of polyethylene imine having a molecular weight range of 30,000 to 40,000, supplied by Badische Anilin Soda Fabriken, West Germany, was applied from a gravure roll. The primer was applied at a rate sufficient to provide an adhesion-promoting coating of polyethylene imine amounting to about 10 grams per thousand square feet of substrate surface on the electrostatic discharge treated substrate surface.

The coated film was then directed to an oven operated at 175° F. where the solvent was removed and the primer coating dried. The substrate then left the oven and was subjected to the corona discharge of an electrostatic discharge apparatus operating at 1200 watts to insure uniform activity of the polyethylene imine surface. The thus treated substrate was then passed over a rubber backup roll and into the nip of an extrusion coating apparatus.

Nylon 6 pellets (purchased from the Spencer Chemical Company as a proprietary item identified as NX142) were supplied to the melt extruder. Because of the high and sharp melting point of the nylon, the temperature provided in the barrel of the extruder was carefully controlled to insure steady state conditions on the extruder screw. A higher temperature at the rear of the extruder was provided. In this example, the nylon 6 had a melt temperature of 550° F. With an output of 200 pounds per hour, the rear zone (hopper end) of the extruder barrel had a temperature of 600° F., the next zone had a temperature of 630° F., the next zone had a temperature of 590° F. and the front zone had a temperature of 565° F.

The distance between the die and the nip in this instance was 5½ inches and the speed with which the substrate film passed through the coating apparatus was 200 feet per minute. Extrusion rate was adjusted to provide a nylon layer on the composite having a thickness of 0.5 mil.

In order to prevent excessive temperature loss at the point where the extruded nylon film impinged upon the coated substrate, rheostat controlled tubular radiant heating elements (Chromalox) were placed in the area between the die and the nip, adjacent to the substrate. The rheostat was adjusted to maintain the temperature of the area around the nylon 6 extrudate at the same temperature as the melt temperature, i.e., about 550° F. By following this procedure, a strong bond was effected between the nylon and the substrate at the nip. The nylon polyethylene composite was cooled as it passed around the roll.

In order to provide a composite film of maximum clarity, the chill roll temperature was carefully controlled. While the precise temperatures required will vary with die temperatures, the nylon tape, and the amount of heat supplied to the area by auxiliary heaters, it has been found that maximum film clarity is obtained with nylon 6 type if the chill roll temperature is maintained at 105° F. ± 5° F. and these temperatures were maintained in this example. Where nylon 6/6 types and copolymers thereof are used, a chill roll temperature of 80° F. ± 5° F. are employed for maximum clarity.

After leaving the chill roll, the composite was passed through a steam chamber to increase the moisture level in the nylon to 2.5 percent, and thereafter, it was wound on a storage roll. Subsequent tests of the characteristics of the composite film gave the values listed in the table below. Comparable values are also given in the table for a 50 gauge polyester film having a 0.002 inch polyethylene coating thereon for the purposes of comparison.

TABLE I

| Properties | ASTM No. | Composite of Example I | Composite of 50 gauge polyester and 2 mil thick polyethylene |
| --- | --- | --- | --- |
| Water vapor transmission rate, in grams per 100 sq. in./24 hours at 100° F.+91% relative humidity | D697-42T | 0.68 | 0.4 |
| Oxygen transmission rate, in cc., (STP)/100 sq. in. per day/atm. at 39° F. and 76-86% relative humidity | | <1.95 | 2.50 |
| Elongation, percent at 73° F., 50% R.H. to fail point | D882-46T | [1] 614 [2] 705 | 37 71 |
| Tensile strength, in lb. force/in. width at 73°+50% R.H. to fail point | D882-46T | [1] 21.5 [2] 16.1 | 10 12 |
| Tear, (Elmendorf), grams, 73° F | D689-44 | [1] 80 [2] 164.8 | 68.8 122 |
| Burst, (Mullen), lbs./sq. in | D774-46 | 31.7 | 40 |
| Impact, 9 in. drop, 6 oz. ball, no. of balls dropped | | >250 | 119 |

[1] Machine direction.
[2] Across machine direction.

EXAMPLE II

The composite film prepared according to example I was passed on suitable rollers adjacent to electrostatic discharge electrodes supplied with 1800 watts to insure a sufficiently and uniformly active surface. The composite was then advanced through a gravure coating head where a 1 percent solution in isopropanol of polyethylene imine was applied at a rate sufficient to provide an adhesion-promoting coating of polyethylene imine amounting to about 10 grams per thousand square feet of substrate surface. The coated film was then directed to an oven operating at 175° F. to remove the solvent.

The composite film was then passed through a second gravure coating head where saran lacquer containing 15 percent of a copolymer of vinylidene chloride and acrylonitrile (supplied by Dow Chemical Company under the designation Dow F-220) in acetone. A gravure roll of 65 IG quadrangular cell configuration was used to apply the saran lacquer. The composite film was then passed through an air circulating oven operating at a temperature of 220° F. at the first half of the oven and 245° F. in the second half. Air circulation in the oven was 18,000 cubic feet per minute. The completed composite film, after drying of the saran coating, was wound on a storage roll.

Subsequent tests of the characteristics of this film give the values summarized in table II. Also given for comparative purposes are the same properties of a 50 gauge polyester film having a saran coating and a 0.002 inch thick polyethylene coating.

TABLE II

| Properties | Composite of example II | 50 gauge polyester, coated with Saran and 0.002 in. polyethylene |
| --- | --- | --- |
| Water vapor transmission rate, as in Table I | 0.40 | 0.35 |
| Oxygen transmission rate, as in Table I | <0.60 | <0.8 |
| Elongation, as in Table I | [1] 614 [2] 705 | 85 90 |
| Tensile strength, as in Table I | [1] 21.5 [2] 16.1 | 14.5 14.1 |
| Tear, as in Table I | [1] 80 [2] 164.8 | 41.6 209 |
| Burst, as in Table I | 31.7 | 36.7 |
| Impact, as in Table I | >250 | 230 |

[1] Machine direction.
[2] Across machine direction.

EXAMPLE III

A composite film is prepared as described in example I, except that the nylon film has a thickness of 0.25 mil. A single sheet of this composite film, 6 in. by 14 in. in dimension is folded in its long direction toward the polyethylene surface, to form a folded sheet 6 in. by 7 in. The open sides of the folded sheet are then heat-sealed to form a hermetically sealed package.

EXAMPLE IV

A composite film is prepared as described in example II, except that the nylon film has a thickness of 0.25 mil. A single sheet of this composite film, 5 in. by 14 in. is folded in its long direction toward the polyethylene surface to form a folded sheet 6 in. by 7 in. The open sides of the folded sheet are then heat-sealed to form a hermetically sealed package.

EXAMPLE V

Polyethylene film having a thickness of 2.0 mils and a width of 43 inches was provided on one side thereof with a coating of Daran 210. Daran 210 is a copolymer of vinyl chloride and vinylidene chloride, and is applied to reduce the oxygen permeability of the film. The coated polyethylene film was fed at a rate of 120 feet per minute into a coating head, which applied a polyurethane adhesion-promoting primer of the type sold by Talon Adhesives Corporation under the trade name Cemen-TAC NA-141K. The primer was applied to the Daran coated side of the polyethylene sheet as a 10 percent solution of urethane solids in methyl ethyl ketone. Approximately 15 grams of solids per 1,000 square feet of film surface was deposited.

The primed film was then passed through an oven having a temperature of 125° F. to remove the solvents from the primer coat. The substrate was then passed over a backup roll into the nip of an extrusion coating apparatus.

Nylon 6 pellets (purchased from Spencer Chemicals Division of Gulf Oil Corp. under the code 606) were fed to the melt extruder. In this example, the nylon 6 had a melt temperature of 555° F. At an output of 200 pounds per hour, the rear zone temperature (feed hopper end) of the extruder barrel was 500° F. The three adjacent barrel zone temperatures were 560° F., 550° F. and 575° F. respectively. Die temperature was carefully controlled at 540° F. in order to minimize melt viscosity variations across the web.

The distance between the die lips and the nip was 4½ inches. Nylon melt, 1 mil. thick, was extruded onto the primed substrate at a line speed of 120 feet per minute. The nylon-Daran coated polyethylene composite cooled as it passed around the metal chill roll maintained at 108° F.

After leaving the chill roll, the composite was passed through a steam chamber to increase the moisture content of the nylon to 1.8 percent. Thereafter it was wound into a master roll. Sufficient bond strength developed between the film components, during a 72 hour room temperature cure, that attempted separation of the films resulted in a failure of the polyethylene rather than the adhesive bond. Subsequent testing of the composite's characteristics gave the values listed below

| | Composite |
|---|---|
| Water vapor transmission rate (gms./100 in.²/24 hrs.) at 100° F. and 91% relative humidity | .40 |
| Oxygen Transmission Rate (cc. STP/100 in.²/24 hrs.) at 73° F. and 50% R.H. | <1.0 |
| Elongation percent at 73° F. and 50% R.H. | { ¹ 660 / ² 740 } |
| Tensile strength (lbs./in. width) 73° F. and 50% R.H. | { ¹ 16.2 / ² 15.3 } |
| Burst (Mullen) lbs./sq. in. | 24 |
| Tear (Elmendorf) gms. 73° F. and 50% R.H. | { ¹ 76 / ² 190 } |

¹ Machine Direction.
² Transverse Direction.

We claim:

1. A composite film structure comprising, in tightly joined lamination:
  a. a substrate layer of a polyolefin having one surface thereof treated by subjecting it to oxidative influences to increase the free surface energy thereof as measured by an increase in wettability to water, the treated surface of the substrate layer being uniformly coated with;
  b. an intermediate adhesion-promoting primer layer; and
  c. a tightly adhering layer over the primer layer of a film-forming synthetic linear polyamide, the polyamide layer having been joined to the film structure by extrusion coating the polyamide in molten form onto a film of the polyolefin bearing the primer layer.

2. The composite film structure of claim 1, wherein the intermediate adhesion-promoting primer is a polyalkylene imine comprised of alkylene units containing from 2 to about 4 carbon atoms.

3. The composite film structures of claim 1, wherein a film of a saran material selected from the group consisting of copolymers of vinylidene chloride and acrylonitrile and copolymers of vinylidene chloride and vinyl chloride, is provided intermediate the primer layer and the layer of synthetic linear polyamide.

4. The composite of claim 1, wherein the polyolefin substrate is polyethylene.

5. The composite of claim 2, wherein the polyalkylene imine is polyethylene imine.

6. The composite film structure of claim 1, wherein the intermediate adhesion-promoting primer is a urethane-based primer.

7. The composite film structure of claim 1, wherein the intermediate adhesion-promoting primer is a dibutyl tin dilaurate-catalyzed urethane prepolymer.

8. A composite film structure comprising, in tightly joined lamination:
  a. a substrate layer of a polyolefin having one surface thereof treated by subjecting it to oxidative influences to increase the free surface energy thereof as measured by an increase in wettability to water, the treated surface of the substrate layer being uniformly coated with;
  b. an intermediate adhesion-promoting primer layer of a polyalkylene imine comprised of alkylene units containing from 2 to about 4 carbon atoms, the exposed surface of the polyalkylene imine layer being oxidized; and
  c. a tightly adhering layer over the oxidized surface of the polyalkylene imine of a film-forming synthetic linear polyamide, the polyamide layer having been joined to the film structure by extrusion coating the polyamide in molten form onto a film of the polyolefin bearing the primer layer.

9. The composite of claim 8, wherein the polyolefin substrate is polyethylene.

10. The composite of claim 8, wherein the polyolefin substrate is polypropylene.

11. The composite of claim 8, wherein the polyalkylene imine is polyethylene imine.

12. The composite of claim 8, wherein the surfaces of the substrate and of the polyalkylene imine layer are subjected to electrostatic discharge treatment.

13. The composite of claim 8, wherein the film-forming synthetic linear polyamide is selected from the group consisting of nylon-type 6, nylon-type 6/6, , copolymers of nylon-type 6 and nylon-type 6/6, and terpolymers of nylon-type 6, nylon-type 6/6 and nylon-type 6/10.

14. A composite film structure comprising, in tightly joined lamination:
  a. a substrate layer of a polyolefin having one surface thereof treated by subjecting it to oxidative influences to increase the free surface energy thereof as measured by an increase in wettability to water, the treated surface of the substrate layer being uniformly coated with;
  b. an intermediate adhesion-promoting primer layer of a polyalkylene imine comprised of alkylene units containing from 2 to about 4 carbon atoms, the exposed surface of the polyalkylene imine layer being treated by subjecting it to oxidative influences;
  c. a tightly adhering layer over the treated surface of the polyalkylene imine of a film-forming synthetic linear polyamide, the exposed surface of the synthetic linear polyamide being treated as in (a), the treated synthetic linear polyamide surface being uniformly coated in turn with;
  d. a second adhesion-promoting primer layer; and
  e. a coating over the second primer layer, of saran material selected from the group consisting of copolymers of vinylidene chloride and acrylonitrile and copolymers of vinylidene chloride and vinyl chloride; the polyamide layer having been joined to the film structure by extrusion coating the polyamide in molten form onto a film of the polyolefin bearing the primer layer.

15. The composite film structure of claim 14, wherein the saran material is a copolymer of vinylidene chloride and acrylonitrile.

16. The composite film structure of claim 14, wherein the saran material is a copolymer of vinylidene chloride and vinyl chloride.

17. A composite film structure comprising, in tightly joined lamination;
  a. a substrate layer of polyethylene having a thickness between about 0.8 mil and about 3 mils, and having one surface thereof treated with electrostatic discharge to render it more receptive to adherent coatings, the treated surface of the substrate layer being uniformly coated with;
b. an intermediate adhesion-promoting primer layer of between about 2 and about 30 grams per thousand square feet of substrate surface of polyalkylene imine comprised of alkylene units containing from 2 to about 4 carbon atoms, the exposed surface of the polyalkylene imine layer being treated with electrostatic discharge; and
c. a tightly adhering layer over the treated surface of the polyalkylene imine of a film-forming synthetic linear polyamide having a thickness between about 0.1 and about 1.5 mils; the polyamide layer having been joined to the film structure by extrusion coating the polyamide in molten form onto a film of the polyethylene bearing the primer layer.

18. A composite film structure comprising, in tightly joined lamination:
a. a substrate layer of polyethylene having a thickness between about 0.8 mil and about 3 mils, and having one surface thereof treated with electrostatic discharge to render it more receptive to adherent coatings, the treated surface of the substrate layer being uniformly coated with;
b. an intermediate adhesion-promoting primer layer of between about 10 and about 30 grams per thousand square feet of substrate surface of a urethane based primer;
c. a coating of saran material selected from the group consisting of copolymers of vinylidene chloride and acrylonitrile and copolymers of vinylidene chloride and vinyl chloride over the primer layer;
d. a second adhesion-promoting primer layer of a urethane based primer;
e. a tightly adhering layer over the treated surface of the polyalkylene imine of a film-forming synthetic linear polyamide having a thickness between about 0.1 and about 1.5 mils; the polyamide layer having been joined to the film structure by extrusion coating the polyamide in molten form onto a film of the polyethylene bearing the primer layer.

19. The composite film structure of claim 18, wherein the urethane based primer is a dibutyl tin dilaurate-catalyzed urethane prepolymer.

20. The composite of claim 18, wherein the saran material is a copolymer of vinylidene chloride and acrylonitrile.

21. The composite of claim 18, wherein the synthetic linear polyamide portion has a moisture content in the approximate range of 1.5 percent to 4 percent.

22. A composite film structure comprising, in tightly joined lamination:
a. a substrate layer of polyethylene having a thickness between about 0.8 and about 3 mils, and having one surface thereof treated with electrostatic discharge to render it more receptive to adherent coatings, the treated surface of the substrate layer being uniformly coated with;
b. an intermediate adhesion-promoting primer layer of between about 2 and about 30 grams per thousand square feet of substrate surface of polyalkylene imine comprised of alkylene units containing from 2 to about 4 carbon atoms, the exposed surface of the polyalkylene imine layer being treated with electrostatic discharge;
c. a tightly adhering layer over the treated surface of the polyalkylene imine of a film-forming synthetic linear polyamide having a thickness between about 0.1 and about 1.5 mils, the exposed surface of the synthetic linear polyamide being treated with electrostatic discharge and being uniformly coated with;
d. a second adhesion promoting layer of polyalkylene imine; and
e. a coating on the second polyalkylene imine layer of a saran material selected from the group consisting of copolymers of vinylidene chloride and acrylonitrile and copolymers of vinylidene chloride and vinyl chloride in an amount between about ⅓ and about 1 pound per thousand square feet of substrate surface; the polyamide layer having been joined to the film structure by extrusion coating the polyamide in molten form onto a film of the polyethylene bearing the primer layer.

23. A package comprising a sheet of a composite film structure comprising, in tightly joined lamination:
a. a substrate layer of a polyolefin having one surface thereof treated by subjecting it to oxidative influences to increase the free surface energy thereof as measured by an increase in wettability to water, the treated surface of the substrate layer being uniformly coated with;
b. an intermediate adhesion-promoting primer layer; and
c. a tightly adhering layer over the primer layer of a film-forming synthetic linear polyamide, the polyamide layer having been joined to the film structure by extrusion coating the polyamide in molten form onto a film of the polyolefin bearing the primer layer; the sheet being folded to bring two polyolefin surfaces together along one edge of the sheet and the sheet being joined at the edge by a heat seal along at least a portion thereof.

24. The package of claim 23, wherein the fold of the sheet forms one edge and the remaining edges are closed by a heat seal to form a hermetically sealed package.

25. A package comprising a sheet of composite film structure comprising, in tightly joined lamination;
a. a substrate layer of a polyolefin, one surface of which has been treated by subjecting it to oxidative influences to increase the free surface energy thereof as measured in an increase to wettability to water;
b. an intermediate primer layer of a urethane based primer; and
c. a tightly adhering layer over the primer layer of a film-forming synthetic linear polyamide, the polyamide layer having been joined to the film structure by extrusion coating the polyamide in molten form onto a film of the polyolefin bearing the primer layer; the sheet being folded to bring two polyolefin surfaces together along one edge of the sheet and the sheet being joined at the edge by a heat seal along at least a portion thereof.

26. The method for preparing a composite film structure comprising the steps of:
a. treating one surface of a substrate of polyolefin film by subjecting it to oxidative influences to increase the free surface energy thereof as measured by an increase in wettability to water;
b. applying to the treated surface of the substrate film an adhesion-promoting primer layer;
c. treating the exposed surface of the primer as in (a);
d. depositing a melt extruded layer of a normally solid film-forming synthetic linear polyamide in molten form over the treated surface of the primer layer; and
e. cooling the laminate thus formed to a normal temperature.

27. The method of claim 26, synthetic linear polyamide wherein the surface of the composite following step (d) is heated to catalyze the growth of crystals in the synthetic linear polyamide portion of the composite.

28. A method for preparing a composite film structure comprising the steps of:
a. subjecting one surface of a substrate of polyolefin film to electrostatic discharge;
b. applying to the treated surface of the substrate film an adhesion-promoting primer layer;
c. subjecting the exposed surface of the primer layer to electrostatic discharge;
d. depositing a melt extruded layer of a normally solid film-forming synthetic linear polyamide in molten form over the treated surface of the primer layer;
e. adjusting the moisture content of the synthetic linear polyamide to within the range of about 1.5 to about 4 percent; and f. cooling the laminate thus formed to a normal temperature.

29. A method for preparing a composite film structure comprising the steps of:
a. subjecting one surface of a substrate of polyolefin film to electrostatic discharge;
b. applying to the treated surface of the substrate film an adhesion-promoting primer layer;
c. subjecting the exposed surface of the primer layer to electrostatic discharge;
d. depositing a melt extruded layer of a normally solid film-forming synthetic linear polyamide in molten form over the treated surface of the primer layer;
e. subjecting the exposed synthetic linear polyamide surface to electrostatic discharge;
f. applying to an adhesion-promoting primer layer to the treated nylon surface;
g. applying a coating of saran to the electrostatic discharge treated synthetic linear polyamide surface; and
h. cooling the laminate thus formed to a normal temperature.

30. The method of claim 29, wherein the adhesion-promoting primer layer is a dibutyl tin dilaurate-catalyzed urethane prepolymer.

31. A method for preparing a composite film structure comprising the steps of:
a. treating one surface of a substrate of a polyolefin film having a thickness between about 0.8 and about 3 mils with electrostatic discharge;
b. applying to the treated substrate surface between about 2 and about 30 grams per thousand square feet of substrate surface of a polyalkylene imine comprised of alkylene units containing from 2 to about 4 carbon atoms as an adhesion-promoting primer coating;
c. treating the exposed surface of the polyalkylene imine coating with electrostatic discharge;
d. depositing a melt extruded layer of a normally solid film-forming synthetic linear polyamide in molten form having a thickness between about 0.1 and about 1.5 mils over the electrostatic discharge treated polyalkylene imine layer; and
e. cooling the laminate thus formed to a normal temperature.

32. The method of claim 31, wherein the polyolefin substrate film is polyethylene.

33. The method of claim 31, wherein the polyalkylene imine is polyethylene imine.

34. The method of claim 31, including the step of adjusting the moisture content of the synthetic linear polyamide portion of the composite to a value within the approximate range of 1.5 percent to 4 percent.

35. The method of claim 34, wherein the saran material is a copolymer of vinylidene chloride and acrylonitrile.

36. The method of claim 34, including the step of adjusting the moisture content of synthetic linear polyamide portion of the composite to a value within the approximate range of 1.5 percent to 4 percent.

37. The method of claim 34, wherein the exposed synthetic linear polyamide surface is subjected to heat to catalyze the growth of crystals in the synthetic linear polyamide portions of the composite.

38. A method for preparing a composite film structure comprising the steps of:

a. treating one surface of a substrate of polyolefin film by subjecting it to oxidative influences to increase the free surface energy thereof as measured by an increase in wettability to water;
b. applying to the treated surface of the substrate film an adhesion-promoting primer layer;
c. depositing a melt extruded layer of a normally solid film forming nylon in molten form over the primer layer; and
d. cooling the laminate thus formed to a normal temperature.

39. A method for preparing a package comprising the steps of:
a. treating one surface of a substrate of polyolefin film by subjecting it to oxidative influences to increase the free surface energy thereof as measured by an increase in wettability to water;
b. applying to the treated surface of the substrate film an adhesion-promoting primer layer;
c. depositing a melt extruded layer of a normally solid film-forming synthetic linear polyamide in molten form over the primer layer;
d. cooling the laminate thus formed to a normal temperature;
e. folding the laminate to bring two polyolefin surfaces together along at least one edge of the laminate; and
f. joining the laminate at the edge by a heat seal along at least a portion thereof.

40. A method for preparing a composite film structure comprising the steps of:
a. treating one surface of a substrate of a polyolefin film having a thickness between about 0.8 and about 3 mils with oxidative influences;
b. applying to the treated substrate surface between about 10 and about 30 grams per thousand square feet of substrate surface a urethane based primer;
c. applying a coating of a saran material selected from the group consisting of copolymers of vinylidene chloride and acrylonitrile and copolymers of vinylidene chloride and vinyl chloride, over the primer layer;
d. applying a second primer layer of urethane based primer to the exposed surface of saran material; and
e. depositing a melt extruded layer of normally solid film forming synthetic linear polyamide in molten form having a thickness between about 0.1 and about 1.5 mils over the exposed adhesive surface; and
f. cooling the laminate thus formed.

41. The method of claim 40 wherein the primer is dibutyl tin dilaurate-catalyzed urethane prepolymer.

42. The method for preparing a composite film structure comprising the steps of:
a. treating one surface of a substrate of polyolefin film by subjecting it to oxidative influences to increase the free surface energy thereof as measured by an increase in wettability to water;
b. applying a urethane based primer to the treated surface of the substrate film;
c. depositing a melt extruded layer of a normally solid film forming synthetic linear polyamide in molten form over the treated surface of the primer layer; and
d. cooling the laminate thus formed to a normal temperature.

Disclaimer 3,570,748.—*James Warren Coyle*, Montville, N.J., and *Louis John Marsella*, Leominster, Mass. COMPOSITE FILM AND METHOD. Patent dated Mar. 16, 1971. Disclaimer filed Jan. 28, 1974, by the assignee, *Standard Packaging Corporation*.

Hereby enters this disclaimer to claims 1–42 of said patent.

[*Official Gazette August 27, 1974.*]